July 21, 1931.    A. W. BJORKMAN    1,815,609
CHUCK
Filed July 14, 1928

Axel W. Bjorkman  INVENTOR
BY  Mathew E. Bradley  ATTORNEY

Patented July 21, 1931

1,815,609

UNITED STATES PATENT OFFICE

AXEL W. BJORKMAN, OF BROOKLYN, NEW YORK, ASSIGNOR TO OTIS ELEVATOR COMPANY, OF NEW YORK, N. Y., A CORPORATION OF NEW JERSEY

CHUCK

Application filed July 14, 1928. Serial No. 292,776.

This invention relates to chucks, useful, for example, to hold and compress the commutator segments in the manufacture of commutators.

In the manufacture of commutators for dynamo-electric machines, properly shaped bars of conductive material, usually copper, and having a trapezoidal cross-section, are assembled alternately with strips of insulating material, usually of a composition with a large micaceous content. The assembled commutator ring is then compressed and firmly held in a chuck in which, afterwards, the inner surfaces of the commutator ring are machined. During this part of the manufacture it is important that the pressure be applied uniformly in any desired amount over the whole ring and that the ring be maintained substantially circular throughout the operation. It is to this part of the manufacture of commutators that this invention appertains.

One feature of this invention is the provision of a chuck by means of which large compression pressures may be uniformly applied to the commutator assembly.

A second feature of this invention is the provision of a chuck by means of which the commutator assembly is maintained substantially circular in shape while it is being compressed.

A third feature of this invention is the provision of a chuck by means of which the work to be held is quickly and securely gripped.

A fourth feature of this invention is the provision of a chuck in which the movable parts are at all times maintained in correct operative position with respect to each other and the other parts of the chuck.

Other features and advantages will become apparent from the following description and appended claims.

In the drawings:—

Figure 1:
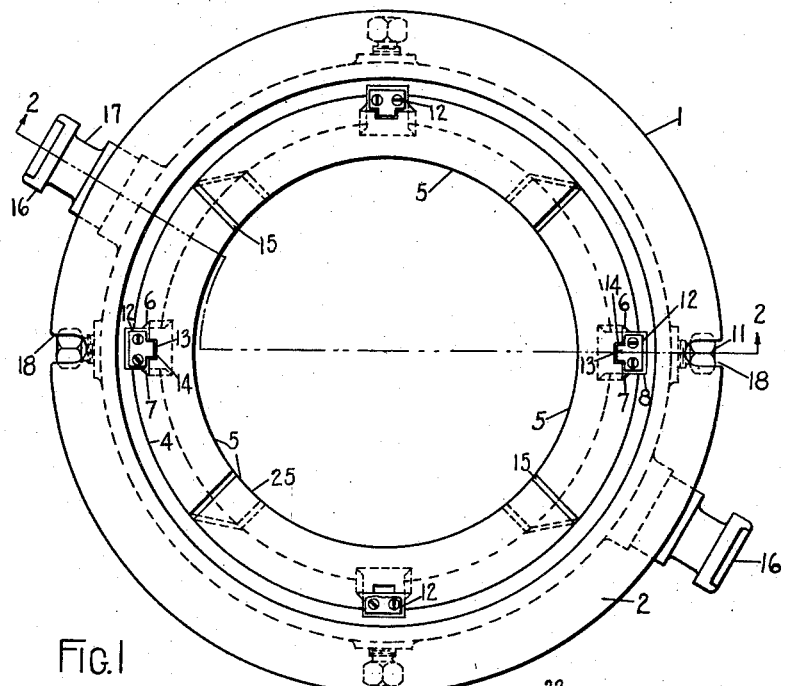
Figure 1 is a plan view of the chuck in the closed and locked position, and showing certain parts of the invisible structure in dotted outline.

Referring to the drawings, 1 is an annular circular frame of suitable material, such as iron or steel, with machined top surface 2 and machined bottom surface 3. Between these surfaces the opening is conical with its large diameter adjacent top surface 2 and with its smaller diameter adjacent bottom surface 3. This forms, within the frame, a conical interior surface 4 which is at an angle with the perpendicular between the top and bottom surfaces. Between this interior surface 4 and the work 20 to be held by the chuck, which is illustrated in dot-and-dash outline as a commutator assembly, there is wedged a tapered ring composed of a plurality of independent segments 5. Each segment has a dovetail groove 6 cut into its exterior surface which is adjacent the frame surface 4, and engaging each groove is a dovetail tongue 7 which is positioned in a slot 8 cut into the frame surface 4 and secured thereto by screws 9. As a result of this construction, the segments are slidably secured to the interior of the frame; and as they engage with the inclined interior surface 4, the segments form a substantially complete ring of decreasing diameter as they are moved toward bottom surface 3 of the frame. Further, the tongues and grooves insure that the segments are at all times in proper alignment and prevent their being displaced circumferentially and radially.

The exterior of each segment 5 has a portion cut out therefrom in such manner that there is a surface 10 at a small acute angle with the top portion of the interior surface 25 of the segment. In the modification illustrated, interior surface 25 of each segment is perpendicular to the top and bottom surfaces 2 and 3, and surface 10 is at a slight angle from the perpendicular so that, were surfaces 10 and 25 continued upwardly, they would intersect. The interior surface of the segment may be at any angle to the perpendicular as desired, and the angle of surface 10 is to be governed accordingly.

Opposite the surfaces 10 there are threaded through the frame 1 and dovetail tongues 7 the set-screws 11 which, when screwed in to engage with their corresponding surfaces 10 after the segments are moved into the chuck, lock the segments in that position. This function is apparent when it is considered that as a result of their angular relation to the perpendicular, the surfaces 10 increase their distance from the center of the frame opening progressively from the portion nearest the top surface 2 to the portion nearest the bottom surface 3. Therefore, although the segments may tend to move out of the work-engaging position, they are unable to so move since the portions of surfaces 10 which must pass the ends of set-screws 11 are larger in diameter than the diameter of the portions of surfaces 10 which are between the ends of the set-screws.

To the top of each tongue 7 is secured a small plate 12 with a lip portion 13 which extends beyond the tongue surface into a slot 14 cut into the dovetail groove in each segment. The slot 14 extends only to the surface 10 with the result that the segments may be withdrawn from the chuck and the diameter of the segmented ring thereby increased until each lip 13 engages the corresponding surface 10. This construction prevents the segments from being completely removed from the frame or from falling out when the chuck is not in use. In either case, the segments are liable to be lost or misplaced, to be broken, nicked or burred, and to be mismated in replacement.

When the work 20 to be held by the chuck is a commutator assembly comprising a number of segments each of which extends over only a small portion of the exterior circumference, the segments 5 are formed so that the separating slots 15 are at an angle to the perpendicular between the top and the bottom surfaces. These angles are also such that adjacent segments have their largest circular length alternately at the top and at the bottom of the chuck. By this construction, the thin segments of the commutator never slip into the separating slots. Also, the pressure applied to each segment is symmetrical with respect to its guiding tongue so that there is no tendency for the segments to bind. Furthermore, any tendency to rotate the work as the segments are forced into work-engaging position is avoided.

For convenience in handling the chuck, there are provided lugs 16 which are tapped into the frame. The lugs have grooves 17 formed therein which may be engaged by rings attached to cranes.

Notches 18 are provided in the frame of the chuck for holding and driving it in a boring or other machine.

Figure 2:
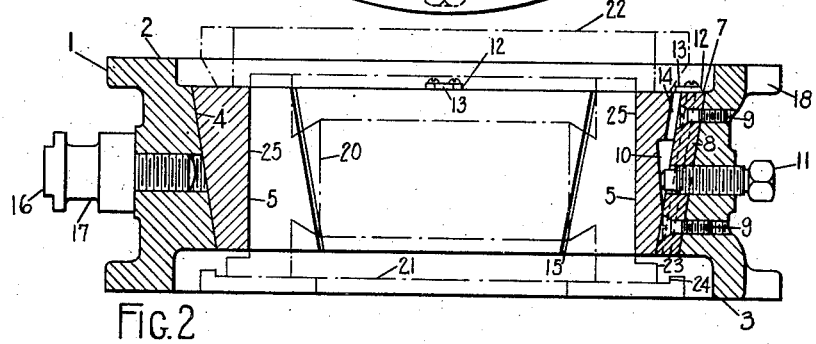
Figure 2 is a sectional elevation of the chuck taken along the line 2—2 of Figure 1 with the commutator ring, the assembly plate and the pressure ring shown in dot-and-dash outline.
Figure 3:
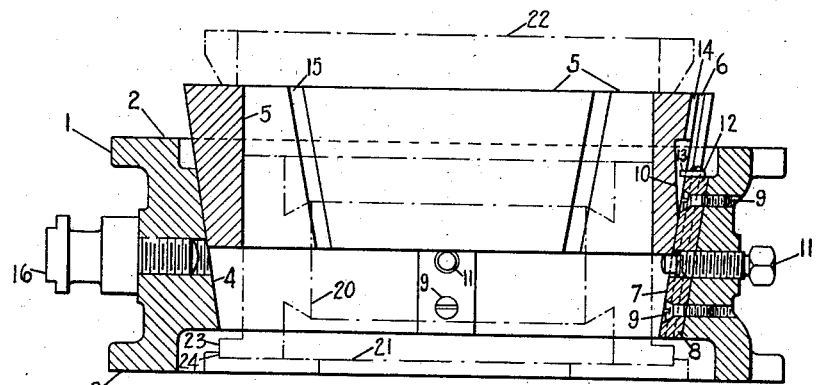
Figure 3 is an elevation of the chuck similar to Figure 2 but showing the position of the parts before compressing the commutator.

When the chuck is used for commutator assemblies, it performs both a compressing and a holding function. Referring to Figure 3, the commutator assembly 20, shown in dot-and-dash outline, is supported by a plate 21. The expanded chuck, with the segments held in the open position by the engagement of the ends of the set-screws 11 with the bottom faces of the segments, is then placed over the assembly. The set-screws are unscrewed and the segments depressed slightly until their inner surfaces engage the exterior surface of the assembly. A press ring 22, shown in dot-and-dash outline, is then brought to bear against the top surfaces of the segments. This press ring exerts tremendous pressures in forcing down the wedge-shaped segments, and at the same time forces down all segments equally. As a result, the commutator is subjected to an exceedingly powerful compressive force on all sides. Thus, the commutator is maintained circular in shape and all looseness taken up. By comparing the relationship of the ends 23 of the commutator to the raised edges 24 of the plate 21 in Figures 3 and 2, it is apparent that this looseness is an appreciable quantity.

After the commutator assembly has been compressed, the segments are secured in place by turning set-screws 11 until they engage surfaces 10. The press ring is removed, and the commutator assembly is ready for any machine work.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A chuck comprising a frame with a circular opening therein for the work, the diameter of said opening decreasing with the depth of the opening, segments of a tapered circular ring adapted to be wedged between the frame and the work, each of said ring segments having a portion cut in its outer surface in such manner that a surface of said cut-out portion is at an angle to the frame-engaging surface of said segment which is greater than the angle of taper of said segment, and members adjustably mounted on said frame to engage said surfaces of said cut-out portions for locking said ring segments in their wedged positions for a range of diameters of work.

2. A chuck comprising a frame with a circular opening therein for the work, the diameter of said opening decreasing with the depth of the opening, segments of a tapered circular ring adapted to be wedged between the frame and the work, a cooperating dovetail tongue and groove for each segment, connecting it and the frame, a stop member secured to each of said tongues, and an abutting portion on each of said segments cooperating with the corresponding stop member.

3. A chuck comprising a frame with an opening therein having a conical surface and segments of a tapered circular ring engaging said conical surface on their outer surfaces and adapted to grip the work on their inner surfaces, each of said segments having the non-arcuate, work-engaging edges of the inner surface thereof at an angle to a plane passing through the axis of generation for said conical surface.

4. A chuck comprising a frame with a conical opening, segments of a circular ring with a cylindrical inner surface and a conical outer surface adapted to be wedged between the frame and the work, and aligning means for each segment of said ring, each of said segments having the lateral edges of the inner surface thereof at an angle to the elements of the cylinder of which said inner surface is a part, and all of said angles being so proportioned that each segment is symmetrical about its aligning means.

5. A chuck comprising a frame with an opening therein having a conical surface, segments of a tapered circular ring slidably engaging said conical surface on their outer surfaces and adapted to grip the work on their inner surfaces, each of said ring segments having a cut-out portion on its outer surface, a dovetail tongue and groove connection between each ring segment and the frame, and members adjustably mounted on said frame to engage said ring segments in said cut-out portions for locking said ring segments in their work-gripping positions.

6. A chuck comprising a frame with a conical opening therein, segments of a tapered circular ring adapted to be wedged between the frame and the work, a cooperating dovetail tongue and groove for each segment connecting the corresponding segment and the frame along the mid-element of the exterior conical surface of the segment to thereby confine the displacement of said segments to a path along the interior face of said frame, each of said ring segments having a flat surface cut into its outer surface, and a bolt for each of said segments threaded in said frame and adapted to project through the corresponding dovetail tongue and groove connection to engage a portion of the flat surface cut into the corresponding segment, the plane of said flat surface being at an angle to said mid-element to effect with said bolt an adjustable lock for the segment throughout a range of displacements thereof that prevents withdrawal of the segment from its wedged, work-securing position.

In testimony whereof, I have signed my name to this specification.

AXEL W. BJORKMAN.